United States Patent Office 3,429,670
Patented Feb. 25, 1969

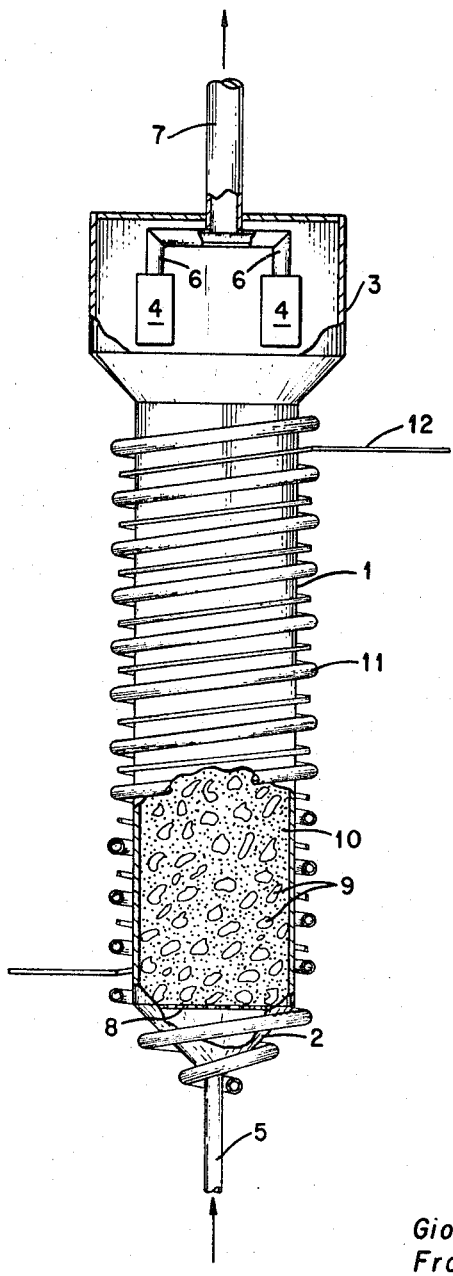
INVENTORS.
Giovanni Camozzo
Francois Coenen
Aldo Francesconi
Giancarlo Pierini
Jean J. Schmets
BY Adolf Stynen
ATTORNEY.

3,429,670
METHOD OF FLUORINATING NUCLEAR FUEL WITH RECOVERY OF PLUTONIUM TETRAFLUORIDE AND URANIUM HEXAFLUORIDE
Giovanni Camozzo, Mol, Francois Coenen, Antwerp, Aldo Francesconi, Turnhout, Giancarlo Pierini, Mol, Jean J. Schmets, Mol-Donk, and Adolf Stynen, Eindhout, Belgium, assignors, by mesne assignments, to the United States of America as represented by the United States Atomic Energy Commission
Filed Sept. 5, 1967, Ser. No. 673,527
Claims priority, application Luxembourg, Sept. 6, 1966, 51,893
U.S. Cl. 23—326
Int. Cl. C01g 1/06, 56/00, 43/06
9 Claims

ABSTRACT OF THE DISCLOSURE

Fluorination of nuclear fuel with a mixture of chlorine trifluoride and at least one of the substances, chlorine and chlorine monofluoride, in order to suppress the formation of plutonium hexafluoride.

---

This invention relates to a method of fluorinating nuclear fuel which makes it possible to obtain quantitative separation of the uranium and the plutonium contained in said fuel.

A known fluorination method using pure or diluted chlorine trifluoride gas has the drawback that, from temperatures of the order of 250° C., part of the plutonium contained in the fuel is volatilized as plutonium hexafluoride, so that it is practically impossible to obtain quantitative separation of the uranium and plutonium. This volatilization increases with temperature and is relatively substantial at temperatures of the order of 600 to 700° C.

The volatilization of plutonium as plutonium hexafluoride, in the method using chlorine trifluoride, seems to occur because of the following reactions:

$$ClF_3 \rightarrow ClF + F_2 \qquad (1)$$

$$PuF_4 + F_2 \rightarrow PuF_6 \qquad (2)$$

The solid plutonium tetrafluoride is thus volatilized as plutonium hexafluoride by the fluorine coming from the dissociation of the chlorine trifluoride. Chlorine trifluoride per se does not appreciably volatilize plutonium as $PuF_6$.

Since the dissociation of the chlorine trifluoride increases with temperature, the concentration of fluorine from this dissociation rises, and consequently the volatilization of plutonium as plutonium hexafluoride increases as well.

The basic aim of the present invention is to eliminate the above mentioned drawbacks of the prior process.

To this end, the method of fluorination according to this invention comprises subjecting nuclear fuel to the action of a reagent mixture containing chlorine trifluoride and at least one substance taken from the group consisting of chlorine and chlorine monofluoride.

In an advantageous application of the subject invention, the method comprises subjecting nuclear fuel to the action of a gas mixture comprising chlorine trifluoride and at least one substance taken from the group consisting of chlorine and chlorine monofluoride.

The addition of chlorine or chlorine monofluoride to chlorine trifluoride improves the separation of the uranium from the plutonium, since the former is transformed into volatile uranium hexafluoride and the latter into solid plutonium tetrafluoride.

The fluorine from the dissociation of the chlorine trifluoride thus reacts with the chlorine to form chlorine monofluoride by the reaction:

$$F_2 + Cl_2 \rightarrow 2ClF \qquad (3)$$

Since plutonium hexafluoride is not very stable in the presence of chlorine, the latter reacts with the plutonium hexafluoride to form plutonium tetrafluoride by the reaction:

$$PuF_6 + Cl_2 \rightarrow PuF_4 + 2ClF \qquad (4)$$

Furthermore, by adding chlorine monofluoride to chlorine trifluoride, the equilibrium of the chlorine trifluoride dissociation reaction mentioned above is shifted towards the formation of chlorine trifluoride, and the concentration of fluorine from this dissociation is consequently reduced.

As with chlorine, plutonium hexafluoride is also rather unstable in the presence of chlorine monofluoride and the following reaction occurs:

$$PuF_6 + ClF \rightarrow PuF_4 + ClF_3 \qquad (5)$$

In an especially advantageous application of the subject of the invention, the method is used in processing compact nuclear fuel. In this case it is thus possible to obtain volatile uranium hexafluoride without any prior disintegration of the nuclear fuel.

In a recommended application of the subject invention, the method comprises subjecting the nuclear fuel to the action of a mixture of $ClF_3$ with $Cl_2$ or $ClF$ at a temperature between 25 and 700° C., but preferably between 200 and 500° C.

At any given temperature, it is possible to eliminate entirely plutonium volatilization as its hexafluoride, by using a sufficient concentration of chlorine or chlorine monofluoride in relation to the concentration of chlorine trifluoride.

Further details and features of the invention will be seen from the description given below, purely as an example, of several applications of the method of the invention with reference to the appended drawing.

The figure shows a vertical section of a reactor in which the fluorination method of the invention may be carried out.

The reactor shown consists basically of a vertical column 1 intercalated between a lower funnel-shaped part 2 and a widened upper part 3 in which there are filters 4.

An inlet duct 5 permitting gas to be introduced into the reactor is connected to the bottom of the lower part 2 of the reactor.

A collector duct 6 is connected to the filters 4 and also to a discharge duct 7 crossing the upper surface of the widened part 3.

The lower part 2 and the column 1 are separated by a grid 8 on which may be placed nuclear fuel 9 for regeneration and, where applicable, a solid diluent 10, such as alumina, to dissipate the heat given off by the fluorination reaction.

An electric resistor 12 is coiled round column 1 and permits the reactor to be raised to the desired temperature, while a duct 11 is also coiled around the column 1 and the lower part 2 of the reactor, between the coils of resistor 12. A fluid flows through this duct 11 and allows the reaction temperature to be controlled.

When performing the fluorination method of this invention, a reagent gas mixture containing chlorine trifluoride and either chlorine, chlorine monofluoride or chlorine and chlorine monofluoride in suitable proportions should be introduced into inlet duct 5.

This reagent gas mixture then comes into contact with the nuclear fuel 9 for regeneration placed on grid 8, so as to form uranium hexafluoride and plutonium tetrafluoride, provided of course that the nuclear fuel contains plutonium. The plutonium tetrafluoride is left in the solid state in column 1, while the volatile uranium hexafluoride is successively discharged through filters 4, duct 6 and duct 7. The test below was carried out in a reactor similar to that described above, where the diameter of column 1 was 38 mm.

First test

A 500 g. load of a mixture of $UO_2F_2$, $UF_4$ and $Al_2O_3$ was subjected at 300° C. to the action of an equimolecular mixture of $ClF_3$ and $Cl_2$.

The chlorine trifluoride concentration was 10.3%. The reaction lasted for 40 minutes and the total flow-rate was 260 l./hr. The reaction rate was 0.405 g./min. cm.$^2$.

For purposes of comparison, an identical load of the same mixture was subjected at the same temperature to the action of chlorine trifluoride alone. The chlorine trifluoride concentration, the reaction time, and the total flow-rate were the same as in the case mentioned above. The reaction rate was 0.445 g./min. cm.$^2$.

The reactivity of chlorine trifluoride with the fuels, and the chemical yields, are consequently affected very little by the addition of chlorine to the reaction. The tests mentioned above were carried out in a fluidized bed, whereas the tests below were effected with the reagent mixture being passed across the surface of the fuel.

Second test 500 mg. of plutonium tetrafluoride was processed for 3 hours at 550° C. with a mixture of chlorine trifluoride, chlorine, and argon with respective concentrations of 30%, 45%, and 25%. The linear rate of the gas mixture was 0.615 cm./sec. (at 20° C. and 1 atm.). The volatilization rate of the plutonium tetrafluoride was 0.0 mg./h. cm.$^2$. The same result was obtained at lower temperatures.

For purposes of comparison, 500 mg. of plutonium tetrafluoride was processed at 550° C. with chlorine trifluoride at a concentration of 30% by volume, diluted with argon. The linear rate of the mixture was the same as that of the mixture containing chlorine. The volatilization rate of the plutonium tetrafluoride as plutonium hexafluoride was 82.3 mg./h. cm.$^2$.

Third test

A powder consisting of 500 mg. of uranium tetrafluoride and 500 mg. of plutonium tetrafluoride was processed for 5 hours at 400° C. with a mixture of chlorine trifluoride, chlorine and argon with respective concentrations of 30%, 30% and 40%. The linear rate of the mixture was 0.615 cm./sec. at 20° C. and 1 atm. The quantity of plutonium tetrafluoride volatilized was 0.0%, while 99.9% of the uranium tetrafluoride was volatilized as uranium hexafluoride.

In processing irradiated uranium dioxide fuels containing plutonium dioxide in accordance with the present invention, the uranium dioxide fuel, which may be in pellet form, is reacted with the gaseous mixture of chlorine trifluoride with chlorine and/or chlorine monofluoride in substantially the same way that uranium dioxide was reacted with a mixture of chlorine trifluoride and fluorine in the examples of Patent No. 3,340,019 issued Sept. 5, 1967. The uranium is completely volatilized as $UF_6$ provided the reaction is carried to completion whereas substantially no plutonium is volatilized as $PuF_6$. The three tests given above explain why plutonium volatilization does not occur. The significance of these tests is readily apparent to one skilled in the art when one bears in mind that the initial products obtained when chlorine trifluoride is reacted with uranium dioxide containing some plutonium dioxide are $UO_2F_2$, $UF_4$, and $PuF_4$.

The method of the invention thus has all the advantages of the method using chlorine trifluoride alone and furthermore prevents the plutonium volatilizating as plutonium hexafluoride. The method of the invention makes it possible in particular to transform the uranium contained in nuclear fuel in a compact form into hexafluoride in a single step. Furthermore, this method is also applicable to nuclear fuel in powder form, such as powdered uranium dioxide.

It is clear that the invention is not restricted to the applications described, and that many variants may be found without going outside the framework of the present patent.

We claim:

1. A method of selectively fluorinating uranium and plutonium in nuclear fuels which comprises reacting said nuclear fuels with a mixture comprising chlorine trifluoride and at least one reagent selected from the group consisting of chlorine and chlorine monofluoride to convert said uranium to volatile uranium hexafluoride and said plutonium to nonvolatile plutonium tetrafluoride.

2. A method as recited in claim 1 wherein said mixture comprising chlorine trifluorine and at least one reagent selected from the group consisting of chlorine and chlorine monofluoride includes an inert gas.

3. A method as recited in claim 1, wherein said nuclear fuel is compact nuclear fuel.

4. A method as recited in claim 1, wherein reacting said nuclear fuels with a mixture comprising chlorine trifluoride and at least one reagent selected from the group consisting of chlorine and chlorine monofluoride is conducted at a temperature between 25 and 700° C.

5. A method as recited in claim 1, wherein reacting said nuclear fuels with a mixture comprising chlorine trifluoride and at least one reagent selected from the group consisting of chlorine and chlorine monofluoride is conducted at a temperature between 200 and 500° C.

6. A method as recited in claim 1 which comprises using a mixture comprising chlorine trifluoride and chlorine in which the ratio of the chlorine trifluoride concentration to the chlorine concentration is of the order of 0.1 at least.

7. A method as recited in claim 1 which comprises using a mixture comprising chlorine trifluoride and chlorine in which the ratio of the chlorine trifluoride concentration to the chlorine concentration is between 0.4 and 2.4.

8. A method as recited in claim 1 which comprises using a mixture comprising chlorine trifluoride and chlorine monofluoride in which the ratio of the chlorine trifluoride concentration to the chlorine monofluoride concentration is of the order of 0.02 at least.

9. A method as recited in claim 1 which comprises using a mixture comprising chlorine trifluoride and chlorine monofluoride in which the ratio of the chlorine trifluoride concentration to the chlorine monofluoride concentration is between 0.1 and 2.4.

References Cited

UNITED STATES PATENTS 2,811,413   10/1957   McMillan _____ 23—352

OTHER REFERENCES

Schmets, J., Camozzo, G., Heremans, R., Pierini, G., Reprocessing Mixed Oxide Fuels by Fluorination, Anl.-Trans.-478. Pp. 6–10, Mar. 17, 1967.

Reactor Fuel Processing, S. Lawrosk, et al., vol. 9 #3, pp.159, 161, September 1966.

CARL D. QUARFORTH, *Primary Examiner.*

M. J. McGREAL, *Assistant Examiner.*

U.S. Cl. X.R.

23—344, 352